(12) United States Patent
Gu et al.

(10) Patent No.: US 12,387,876 B2
(45) Date of Patent: Aug. 12, 2025

(54) MULTILAYER ELECTRONIC COMPONENT

(71) Applicant: SAMSUNG ELECTRO-MECHANICS CO., LTD., Suwon-si (KR)

(72) Inventors: Sin Il Gu, Suwon-si (KR); Jin Hyung Lim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 171 days.

(21) Appl. No.: 18/224,670

(22) Filed: Jul. 21, 2023

(65) Prior Publication Data

US 2024/0304385 A1    Sep. 12, 2024

(30) Foreign Application Priority Data

Mar. 9, 2023    (KR) ......................... 10-2023-0031408

(51) Int. Cl.

| | |
|---|---|
| *H01G 4/012* | (2006.01) |
| *H01G 4/008* | (2006.01) |
| *H01G 4/224* | (2006.01) |
| *H01G 4/232* | (2006.01) |
| *H01G 4/248* | (2006.01) |
| *H01G 4/30* | (2006.01) |

(52) U.S. Cl.
CPC ............. *H01G 4/012* (2013.01); *H01G 4/008* (2013.01); *H01G 4/224* (2013.01); *H01G 4/232* (2013.01); *H01G 4/248* (2013.01); *H01G 4/30* (2013.01)

(58) Field of Classification Search
CPC ........ H01G 4/012; H01G 4/008; H01G 4/224; H01G 4/232; H01G 4/248; H01G 4/30; H01G 4/32
See application file for complete search history.

(56) References Cited

U.S. PATENT DOCUMENTS

| | | | |
|---|---|---|---|
| 2010/0039749 A1* | 2/2010 | Ritter ..................... | H01G 4/005 29/25.42 |
| 2012/0188682 A1 | 7/2012 | Sato et al. | |

(Continued)

FOREIGN PATENT DOCUMENTS

| | | |
|---|---|---|
| JP | 2012-164966 A | 8/2012 |
| JP | 2016-178219 A | 10/2016 |
| KR | 10-2021-0025877 A | 3/2021 |

*Primary Examiner* — Michael P McFadden

(74) *Attorney, Agent, or Firm* — Morgan, Lewis & Bockius LLP

(57) ABSTRACT

A multilayer electronic component includes a body including first and second surfaces facing each other in a first direction, and third and fourth surfaces connected to the first and second surfaces and facing each other in a second direction, and including a capacitance forming portion including a dielectric layer and first and second internal electrodes alternately disposed with the dielectric layer interposed therebetween, a lower cover portion disposed between the first surface and the capacitance forming portion, and an upper cover portion disposed between the second surface and the capacitance forming portion, a first external electrode disposed on the third surface, and a second external electrode disposed on the fourth surface, wherein, among the upper cover portion and the lower cover portion, only the upper cover portion includes a buffer electrode.

20 Claims, 7 Drawing Sheets

(56) References Cited

U.S. PATENT DOCUMENTS

| | | | |
|---|---|---|---|
| 2013/0033154 A1* | 2/2013 | Sakuratani | H01G 4/30 310/366 |
| 2013/0241361 A1* | 9/2013 | Lee | H01G 4/012 336/200 |
| 2014/0240895 A1* | 8/2014 | Lee | H01G 4/12 29/25.42 |
| 2015/0318110 A1* | 11/2015 | Lee | H01G 4/30 361/301.4 |
| 2016/0111216 A1* | 4/2016 | Lee | H01G 4/232 361/301.4 |
| 2016/0276104 A1 | 9/2016 | Nishisaka et al. | |
| 2016/0284471 A1* | 9/2016 | Mizuno | H01G 4/1227 |
| 2020/0118760 A1* | 4/2020 | Jun | H01G 4/005 |
| 2021/0065977 A1* | 3/2021 | Kim | H01G 4/012 |
| 2021/0327647 A1* | 10/2021 | Kim | H01G 4/012 |
| 2022/0181087 A1* | 6/2022 | Park | H01G 4/005 |

\* cited by examiner

MULTILAYER ELECTRONIC COMPONENT

CROSS-REFERENCE TO RELATED APPLICATION (S)

This application claims the benefit under 35 USC 119 (a) of Korean Patent Application No. 10-2023-0031408 filed on Mar. 9, 2023 in the Korean Intellectual Property Office, the entire disclosure of which is incorporated herein by reference for all purposes.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, capacitance, and ease of mounting. As various electronic devices such as computers and mobile devices have been reduced in size and increased in power, demand for miniaturization and high capacitance of multilayer ceramic capacitors have been increased. In addition, as the application of MLCCs to automotive electric parts and the like has increased, high reliability of MLCCs in various environments has been required.

In order to achieve miniaturization and high capacitance of MLCCs, it is necessary to improve the capacitance per unit volume of the MLCCs by minimizing the volume of external electrodes.

In order to minimize the volume of external electrodes, there has been an attempt to arrange external electrodes on a surface of a body to which internal electrodes are exposed and on a lower surface of the body, but not on an upper surface of the body, forming an L-shaped structure, to thereby improve the capacitance per unit volume of MLCCs. However, in this case, since the external electrodes are not disposed on the upper surface of the body, moisture resistance reliability may deteriorate.

In addition, in order to solve this problem, a method of disposing a coating layer outside the MLCC having L-shaped external electrodes to prevent external moisture from penetrating into the chip has been proposed. However, in the case of forming the coating layer, adhesion between chips may frequently occur during a coating process and the coating layer may be easily destroyed by external impact.

Therefore, there is a need for a method capable of improving the moisture resistance reliability, while improving the capacitance per unit volume of the MLCC.

SUMMARY

Exemplary embodiments provide a multilayer electronic component having excellent reliability.

Exemplary embodiments provide a multilayer electronic component having improved capacitance per unit volume.

According to an exemplary embodiment, a multilayer electronic component includes: a body including first and second surfaces facing each other in a first direction, third and fourth surfaces connected to the first and second surfaces and facing each other in a second direction, and fifth and sixth surfaces connected to the first to fourth surfaces and facing each other in a third direction, and the body includes a capacitance forming portion including a dielectric layer and first and second internal electrodes alternately disposed with the dielectric layer interposed therebetween, a lower cover portion disposed between the first surface and the capacitance forming portion, and an upper cover portion disposed between the second surface and the capacitance forming portion, wherein, among the upper cover portion and the lower cover portion, only the upper cover portion includes a buffer electrode; a first external electrode disposed on the third surface, connected to the first internal electrode, and extending onto and disposed on a portion of the first surface; and a second external electrode disposed on the fourth surface, connected to the second internal electrode, and extending onto and disposed on a portion of the first surface.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
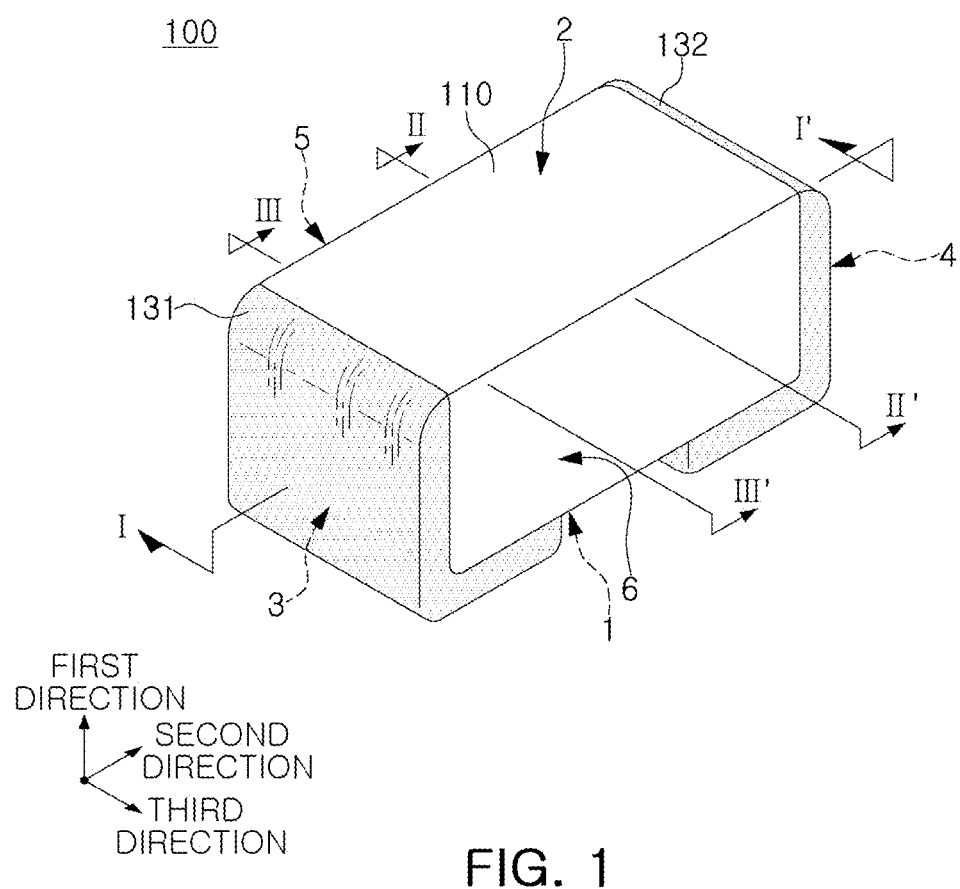
FIG. 1 is a perspective view schematically illustrating a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations, such as "comprises" or "comprising", will be understood to imply the inclusion of stated elements but not the exclusion of any other elements.

In the drawing, a first direction may be defined as a stacking direction or a thickness (T) direction, a second direction may be defined as a length (L) direction, and a third direction may be defined as a width (W) direction.

Multilayer Electronic Component

FIG. 1 is a perspective view schematically illustrating a multilayer electronic component according to an exemplary embodiment in the present disclosure.

Figure 2:
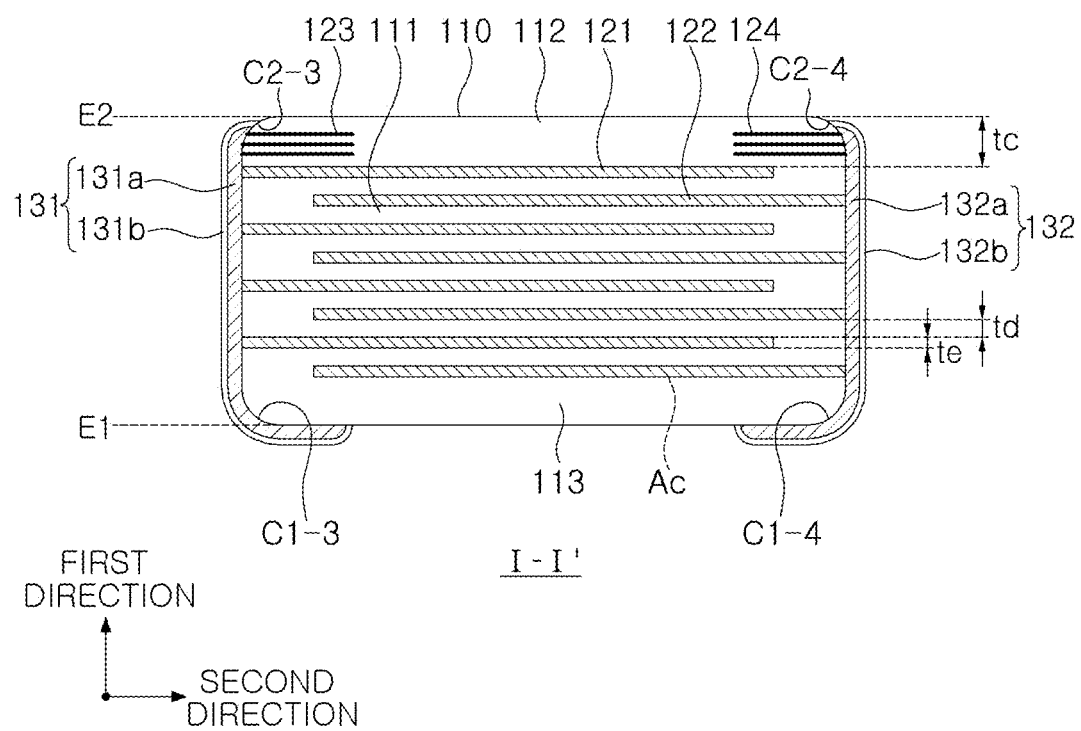
FIG. 2 is a cross-sectional view taken along line I-I' in FIG. 1.

FIG. 2 is a cross-sectional view taken along line I-I' in FIG. 1.

Figure 3:
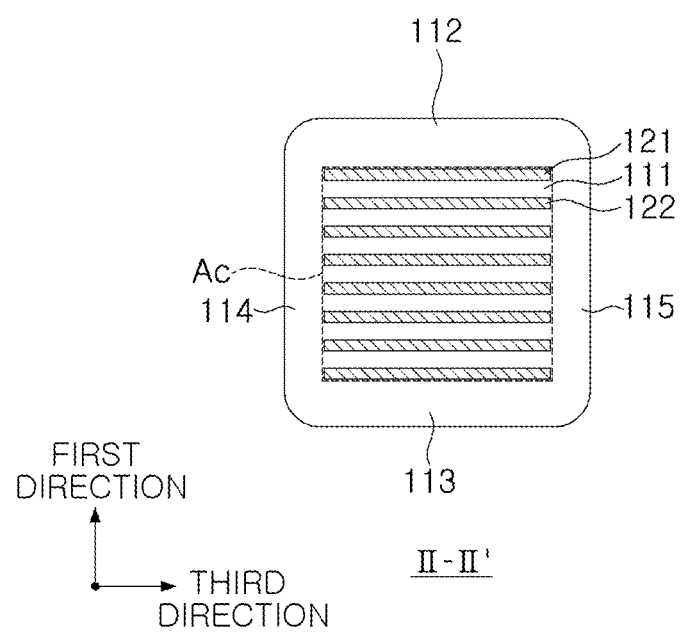
FIG. 3 is a cross-sectional view taken along line II-II' in FIG. 1.

FIG. 3 is a cross-sectional view taken along line II-II' in FIG. 1.

Figure 4:
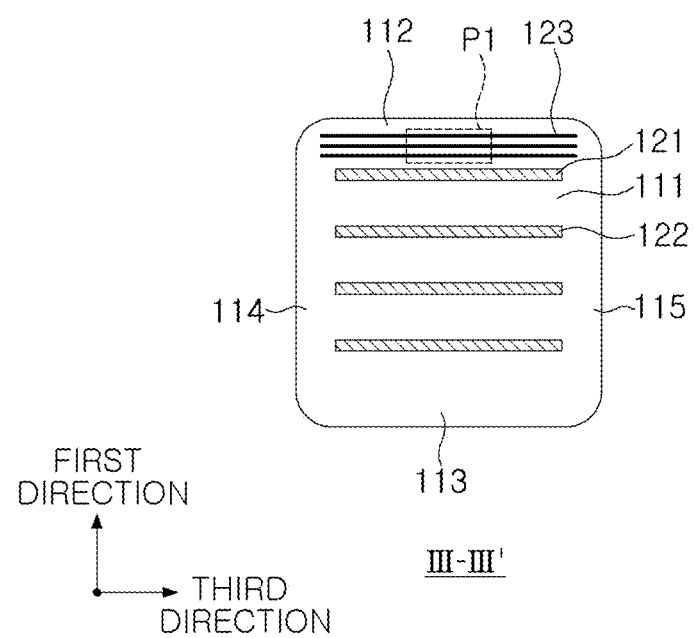
FIG. 4 is a cross-sectional view taken along line III-III' in FIG. 1.

FIG. 4 is a cross-sectional view taken along line III-III' in FIG. 1.

Figure 5:
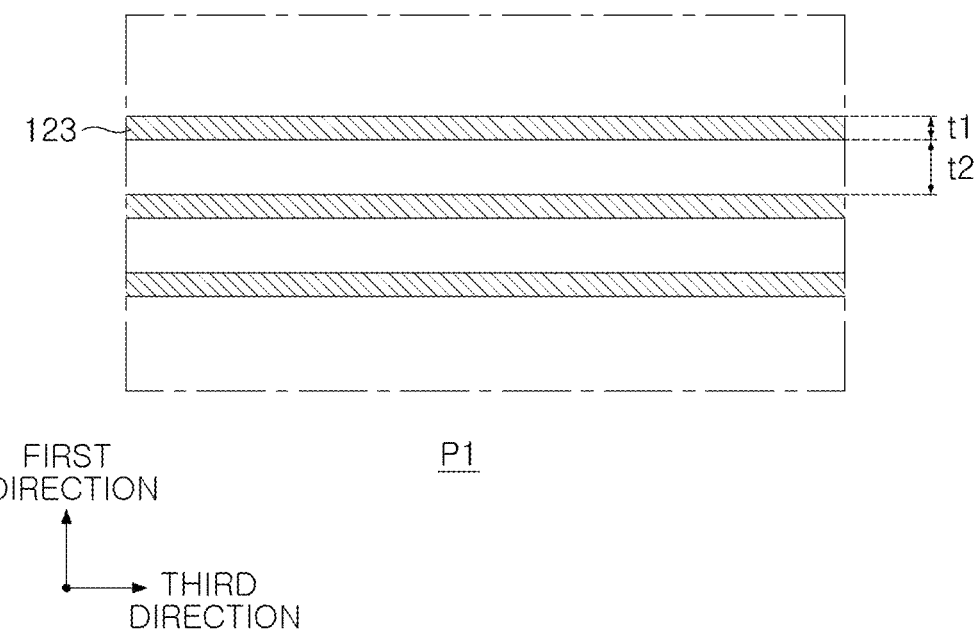
FIG. 5 is an enlarged view of region P1 in FIG. 4.

FIG. 5 is an enlarged view of region P1 in FIG. 4.

Hereinafter, a multilayer electronic component 100 according to an exemplary embodiment in the present disclosure will be described in detail with reference to FIGS. 1 to 5. In addition, a multilayer ceramic capacitor (MLCC) will be described as an example of a multilayer electronic component, but the present disclosure is not limited thereto and may also be applied to various multilayer electronic components, such as inductors, piezoelectric devices, varistors, or thermistors.

The multilayer electronic component 100 according to an exemplary embodiment in the present disclosure may include a body 110 including first and second surfaces 1 and 2 facing each other in a first direction, third and fourth surfaces 3 and 4 connected to the first and second surfaces and facing each other in a second direction, and fifth and sixth surfaces 5 and 6 connected to the first to fourth surfaces and facing each other in a third direction, and including a capacitance forming portion Ac including a dielectric layer 111 and first and second internal electrodes 121 and 122 alternately disposed with the dielectric layer interposed therebetween, a lower cover portion 113 disposed between the first surface and the capacitance forming portion, and an upper cover portion 112 disposed between the second surface and the capacitance forming portion; a first external electrode 131 disposed on the third surface, connected to the first internal electrode, and extending onto and disposed on a portion of the first surface; and a second external electrode 132 disposed on the fourth surface, connected to the second internal electrode, and extending onto and disposed on a portion of the first surface, wherein, among the upper cover portion and the lower cover portion, only the upper cover portion includes buffer electrodes 123 and 124.

In order to achieve miniaturization and high capacitance of MLCCs, it is necessary to improve the capacitance per unit volume of the MLCCs by minimizing the volume of external electrodes.

In order to minimize the volume of external electrodes, there has been an attempt to arrange external electrodes on a surface of a body to which internal electrodes are exposed and on a lower surface of the body, but not on an upper surface of the body, forming an L-shaped structure, to thereby improve the capacitance per unit volume of MLCCs, but, in this case, since the external electrodes are not disposed on the upper surface of the body, moisture resistance reliability may deteriorate.

In addition, in order to solve this problem, a method of disposing a coating layer outside the MLCC having L-shaped external electrodes to prevent external moisture from penetrating into the chip has been proposed, but in the case of forming the coating layer, adhesion between chips may frequently occur during a coating process and the coating layer may be easily destroyed by external impact.

In contrast, according to an exemplary embodiment in the present disclosure, the external electrodes have an L-shaped structure and only the upper cover portion, among the upper cover portion and the lower cover portion, includes the buffer electrodes 123 and 124, and thus, moisture resistance reliability may be improved, while the capacitance per volume is improved.

Hereinafter, each component included in the multilayer electronic component 100 according to an exemplary embodiment in the present disclosure will be described.

In the body 110, the dielectric layer 111 and the internal electrodes 121 and 122 are alternately stacked.

Although a specific shape of the body 110 is not particularly limited, as shown, the body 110 may have a hexahedral shape or a shape similar thereto. Due to the shrinkage of ceramic powder particles included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an exemplary embodiment, the body 110 may include a first-third corner c1-3 connecting the first surface and the third surface, a first-fourth corner c1-4 connecting the first surface and the fourth surface, a second-third corner c2-3 connecting the second surface and the third surface, and a second-fourth corner c2-4 connecting the second surface and the fourth surface. The first-third corner and the second-third corner may be contracted to the center of the body in the first direction in a direction toward the third surface, and the first-fourth corner and the second-fourth corner may be contracted to the center of the body in the first direction.

As a margin region in which the internal electrodes 121 and 122 are not disposed overlaps the dielectric layer 111, a step occurs due to a thickness of the internal electrodes 121 and 122, and thus, a corner connecting the first surface to the third to fifth surfaces and/or a corner connecting the second surface to the third to fifth surfaces may be contracted toward the center of the body 110 in the first direction when viewed based on the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may be contracted toward the center of the body 110 in the first direction when viewed based on the first surface or the second surface. Alternatively, as the corners connecting each surface of the body 110 are rounded by performing a separate process, the corner connecting the first surface to the third to sixth surfaces and/or the corner connecting the second surface to the third to sixth surfaces may have a round shape.

The corner may include a first-third corner connecting the first surface and the third surface, a first-fourth corner connecting the first surface and the fourth surface, a second-third corner connecting the second surface and the third surface, and a second-fourth corner connecting the second surface and the fourth surface. In addition, the corner may include a first-fifth corner connecting the first and fifth surfaces, a first-sixth corner connecting the first and sixth surfaces, a second-fifth corner connecting the second fifth surfaces, and a second-sixth corner connecting the second and sixth surfaces. The first to sixth surfaces of the body 110 may be generally flat surfaces, and non-flat regions may be considered as corners. Hereinafter, an extension line of each surface may refer to a line extending based on a flat portion of each surface.

Meanwhile, in order to suppress a step difference caused by the internal electrodes 121 and 122, after stacking, the internal electrodes may be cut to be exposed to the fifth and sixth surfaces 5 and 6 of the body and then a single dielectric layer or two or greater dielectric layers may be stacked on both side surfaces of a capacitance forming portion Ac to form margin portions 114 and 115, and in this case, the portion connecting the first surface to the fifth and sixth surfaces and the portion connecting the second surface to the fifth and sixth surfaces may not be contracted.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited long as as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $BaTiO_3$ and $(Ba_{1-x}Ca_x) TiO_3$ (0<x<1), $Ba (Ti_{1-y}Ca_y) O_3$ (0<y<1), $(Ba_{1-x}Ca_x) (Ti_{1-y}Zr_y) O_3$ (0<x<1, 0<y<1) or $Ba (Ti_{1-y}Zr_y) O_3$ (0<y<1) in which Ca, Zr, and the like are partially dissolved in $BaTiO_3$.

In addition, as a material for forming the dielectric layer 111, various ceramic additives, organic solvents, binders, dispersants, etc. may be added to the powder particles such as barium titanate ($BaTiO_3$) according to purposes of the present disclosure.

Meanwhile, an average thickness of the dielectric layer 111 may not be particularly limited.

However, in general, when the dielectric layer is formed to be thin to have a thickness less than 0.6 μm, in particular, when the thickness of the dielectric layer is 0.35 μm or less, it may be vulnerable to deterioration in reliability due to moisture, plating solution, etc. penetrating into the body.

According to an exemplary embodiment in the present disclosure, by disposing the buffer electrodes 123 and 124 in the upper cover portion 112, it is possible to prevent moisture, plating solution, etc. from penetrating into the body, so that excellent reliability may be secured even when the average thickness td of at least one of the plurality of dielectric layers 111 is 0.35 μm or less.

Therefore, even when the average thickness td of at least one of the plurality of dielectric layers 111 is 0.35 μm or less, the effect of improving reliability according to the present disclosure may be more remarkable.

The average thickness td of the dielectric layer 111 may refer to an average size of the dielectric layer 111 disposed between the first and second internal electrodes 121 and 122 in the first direction.

An average thickness of the dielectric layer 111 may be measured by scanning an image of a cross-section of the body 110 in the length and thickness directions (L-T) with a scanning electron microscope (SEM) at a magnification of 10,000. More specifically, the average value may be measured by measuring the thickness of one dielectric layer at 30 equally spaced points in the longitudinal direction in the scanned image. The 30 points at equal intervals may be designated in the capacitance forming portion Ac. In addition, if the average value is measured by extending the measurement of the average value to 10 dielectric layers, the average thickness of the dielectric layers may be more generalized. Other methods and/or tools appreciated by one of ordinary skill in the art, even if not described in the present disclosure, may also be used.

The body 110 may include the capacitance forming portion Ac formed inside the body 110 and forming capacitance with the first internal electrode 121 and the second internal electrode 122 disposed to face each other with the dielectric layer 111 interposed therebetween and cover portions 112 and 113 formed above and below the capacitance forming portion Ac in the first direction.

In addition, the capacitance forming portion Ac is a portion that contributes to formation of capacitance of the capacitor, which may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 may be disposed between the second surface 2 and the capacitance forming portion Ac, and the lower cover portion 113 may be disposed between the first surface 1 and the capacitance forming portion Ac.

The upper cover portion 112 and the lower cover portion 113 may be formed by stacking a single dielectric layer or two or greater dielectric layers on upper and lower surfaces of the capacitance forming portion Ac in the thickness direction, respectively, and may serve to prevent damage to the internal electrodes due to physical or chemical stress.

According to an exemplary embodiment in the present disclosure, only the upper cover portion 112, among the upper cover portion 112 and the lower cover portion 113, may include the buffer electrodes 123 and 124.

The buffer electrodes 123 and 124 may be disposed in the upper cover portion 112 to prevent penetration of moisture, plating solution, etc. into the body. Since external electrodes are not disposed on the second surface 2 of the body, moisture, a plating solution, and the like may easily penetrate into the body. In the case of disposing the buffer electrodes 123 and 124 in the upper cover portion 112 according to an exemplary embodiment in the present disclosure, moisture plating solution, and the like penetrating into the second surface 2 of the body may first react with the buffer electrodes 123 and 124 to be prevented from penetrating into the internal electrodes 121 and 122 of the capacitance forming portion Ac.

In an exemplary embodiment, referring to FIG. 5, an average thickness t1 of the buffer electrodes 123 and 124 may be 0.1 μm or greater and 4 μm or less. In this case, the average thickness t1 of the buffer electrode may refer to an average thickness of a single buffer electrode.

If the average thickness t1 of the buffer electrode is less than 0.1 μm, the effect of preventing penetration of moisture, plating solution, etc. may be insufficient, and if the average thickness t1 exceeds 4 μm, the thickness of the upper cover portion 112 may become thick, resulting in a decrease in capacitance per unit volume of the electronic component.

The average thickness t1 of the buffer electrode may be measured by scanning an image of a cross-section of the body 110 in the width and thickness directions (W-T) with a scanning electron microscope (SEM) at a magnification of 10,000. More specifically, an average value may be measured by measuring thicknesses of one buffer electrode at 30 equally spaced points in the width direction in the scanned image. Other methods and/or tools appreciated by one of ordinary skill in the art, even if not described in the present disclosure, may also be used.

In an exemplary embodiment, the buffer electrodes 123 and 124 may include a first buffer electrode 123 connected to the first external electrode 131 and a second buffer electrode 124 connected to the second external electrode 132.

As the first buffer electrode 123 is connected to the first external electrode 131 and the second buffer electrode 124 is connected to the second external electrode 132, the first buffer electrode 123 may more easily react first with moisture, plating solution, etc., thereby preventing penetration of moisture, plating solution, etc. into the internal electrodes 121 and 122 of the capacitance forming portion Ac.

In an exemplary embodiment, two or more and ten or less first and second buffer electrodes 123 and 124 may be disposed in the first direction, respectively. Two or more and ten or less first buffer electrodes 123 may be disposed in the first direction, and two or more and ten or less second buffer electrodes 124 may be disposed in the first direction. The number of stacked buffer electrodes 123 and the number of stacked second buffer electrodes 124 may not need to match.

By arranging two or more buffer electrodes 123 and 124 in the first direction, the effect of preventing penetration of moisture, plating solution, etc. may be further improved, but if more than ten buffer electrodes are disposed, the thickness of the upper cover portion 112 may increase and the capacitance per unit volume of the multilayer electronic component may decrease.

In this case, an average distance t2 between adjacent first buffer electrodes, among the first buffer electrodes, may be greater than or equal to 0.2 μm and less than or equal to 10 μm.

If the average distance t2 between adjacent first buffer electrodes is less than 0.2 μm, the effect of disposing two or more first buffer electrodes may be insufficient, and if the average thickness t2 exceeds 10 μm, the thickness of the upper cover portion 112 may increase and the capacitance per unit volume of the multilayer electronic component may decrease.

The average distance t2 between adjacent first buffer electrodes may be measured by scanning an image of a cross-section of the body 110 in the width and thickness directions (W-T) with a scanning electron microscope (SEM) at a magnification of 10,000. More specifically, an average value may be measured by measuring distances in the thickness direction between two buffer electrodes adjacent to each other in the scanned image at 30 equally spaced points in the width direction. Other methods and/or tools appreciated by one of ordinary skill in the art, even if not described in the present disclosure, may also be used.

In an exemplary embodiment, the buffer electrodes 123 and 124 may be disposed between a 15/100 point and an 85/100 point of the upper cover portion 112 in the first direction. For example, the buffer electrodes 123 and 124 may be disposed in a region between 15/100 and 85/100 of a thickness, tc, of the upper cover portion 112. The depth may be measured by scanning electron microscope (SEM). Other methods and/or tools appreciated by one of ordinary skill in the art, even if not described in the present disclosure, may also be used.

If the buffer electrodes 123 and 124 are disposed to be too close to the internal electrodes, the possibility of penetration of moisture and a plating solution to the internal electrodes 121 and 122 of the capacitance forming portion Ac may increase, and if the first and second buffer electrodes 123 and 124 are disposed to be too close to the second surface 2, the first and second buffer electrodes 123 and 124 may be exposed to the second surface 2 and external electrodes may be formed or a plating layer may be formed on the second surface.

In an exemplary embodiment, the buffer electrodes 123 and 124 may include one or more of Ni, Cu, Pt, Pd, and alloys thereof.

The buffer electrodes 123 and 124 are preferably formed of materials that may be sintered at the same time as dielectrics in order to simplify the manufacturing process of multilayer electronic components, and may be preferably formed of materials that may easily react with plating and water solutions.

In an exemplary embodiment, the buffer electrodes 123 and 124 may include one or more additives of ceramic particles and glass, and a ratio of an area occupied by the additive to a total area of the buffer electrodes 123 and 124 in a cross-section of the buffer electrodes 123 and 124 in the first and third directions may be 20% or more and 60% or less. The ceramic particles may serve to reduce a difference in sintering start temperature between dielectric layer 111 and the buffer electrodes 123 and 124 to preventing agglomeration or breakage of the buffer electrodes 123 and 124, and the glass may serve to improve bonding force with the dielectric layer 111 to prevent the occurrence of delamination. The ratio may be determined by electron microscopy energy and/or dispersive X-ray spectroscopy (EDS), and may be determined by processing the micrographs with an image processing software. Other methods and/or tools appreciated by one of ordinary skill in the art, even if not described in the present disclosure, may also be used.

If the ratio of the area occupied by the additive to the total area of the buffer electrodes 123 and 124 is less than 20%, the aforementioned effect may be insufficient, and if the ratio of the area occupied by the additive exceeds 60%, the reactivity with moisture, plating solution, etc. may be lowered and the effect of improving moisture resistance reliability may be insufficient.

In some embodiments, in a cross-section of the multilayer electronic component in the first and third directions, the buffer electrode may extend beyond ends of the first and second internal electrodes, for example, as illustrated in FIG. 4.

The upper cover portion 112 may include the same material as that of the dielectric layer 111 in addition to the buffer electrode. The lower cover portion 113 may not include an internal electrode and a buffer electrode, and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the thickness of the cover portions 112 and 113 may not be limited. However, the thickness tc of the cover portions 112 and 113 may be 15 μm or less in order to more easily achieve miniaturization and high capacitance of the multilayer electronic component.

The average thickness tc of the cover portions 112 and 113 may refer to a size in the first direction, and may be a value obtained by averaging sizes of the cover portions 112 and 113 measured at five equally spaced points above or below the capacitance forming portion Ac.

In an exemplary embodiment, referring to FIGS. 4 and 5, the buffer electrodes 123 and 124 may be linear in a cross-section in first and third directions. Similar to the method of forming the internal electrodes 121 and 122, as a buffer electrode pattern may be formed by applying a conductive paste for a buffer electrode on a ceramic green sheet, the buffer electrode may be observed to have a linear shape in the cross-section in the first and third directions.

However, it should be noted that the present disclosure is not limited thereto and the buffer electrodes 123 and 124 may have any other shapes than the linear shape.

Figure 6:
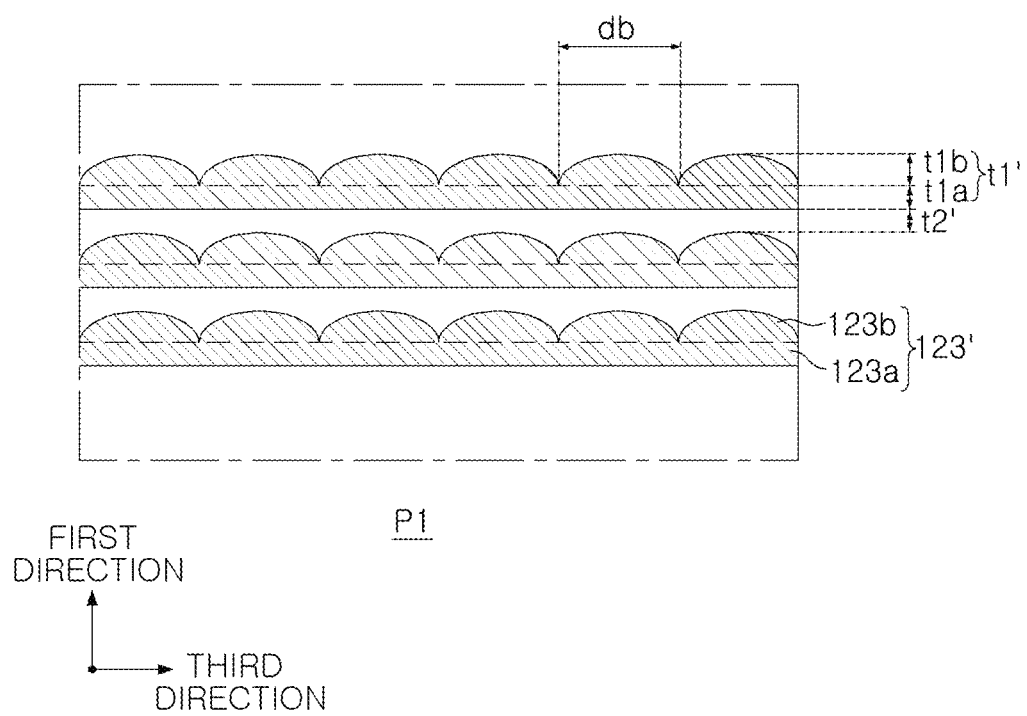
FIG. 6 is a view corresponding to the region P1 in FIG. 4 of a multilayer electronic component according to another exemplary embodiment in the present disclosure.

For example, referring to FIG. 6, which is a diagram corresponding to region P1 in FIG. 4 of the multilayer electronic component according to another exemplary embodiment in the present disclosure, a buffer electrode 123' may include a first layer 123a having a linear shape and a second layer 123b disposed on the first layer and including a plurality of convex portions in a cross-section of the buffer electrode 123' in the first and third directions. Although only a first buffer electrode is illustrated in FIG. 6, a second buffer electrode may also include a first layer having a linear shape and a second layer disposed on the first layer and including a plurality of convex portions.

The second layer 123b including a plurality of convex portions may increase a surface area of the buffer electrode 123' to further increase reactivity with moisture and a plating solution, and thus, better moisture resistance reliability may be secured.

Here, an average size t1b of the convex portion in the first direction in a cross-section in the first and third directions of the buffer electrode may be 0.1 µm or greater and 4 µm or less, and an average size db in the third direction may be 10 µm or greater and 100 µm or less. If the average size t1b of the convex portion in the first direction is less than 0.1 µm, the effect based on the second layer 123b described above may be insufficient, and if the average size t1b exceeds 4 µm, the buffer electrode may become excessively thick to increase the thickness of the upper cover portion 112. If the average size db of the convex portion in the third direction is less than 10 µm, it may be difficult to form the convex portion, and if the average size db of the convex portions is greater than 100 µm, the effect based on the second layer 123b described above may be insufficient.

In addition, the convex portion may have a semicircular shape in the cross-section of the buffer electrode in the first and third directions. The average size t1b and the average size db may be measured by scanning an image of a cross-section of the body 110 in the width and thickness directions (W-T) with a scanning electron microscope (SEM) at a magnification of 10,000. The average value may be measured by measuring the maximum sizes of two or more convex portions along the first direction (for t1b) or along the third direction (for db) in the scanned image. Other methods and/or tools appreciated by one of ordinary skill in the art, even if not described in the present disclosure, may also be used.

A method of forming the second layer 123b including a plurality of convex portions is not particularly limited. For example, after forming the first layer 123a by applying a conductive paste for a buffer electrode on a ceramic green sheet, the conductive paste for a buffer electrode may be additionally printed on the first layer 123a in a line shape to form the second layer 123b including a plurality of convex portions.

Meanwhile, an average thickness of the first layer 123a is not particularly limited, but may be 0.1 µm or greater and 4 µm or less. In addition, a distance between the adjacent buffer electrodes 123' is not particularly limited, but may be 0.2 µm or greater and 10 µm or less.

Figure 7:
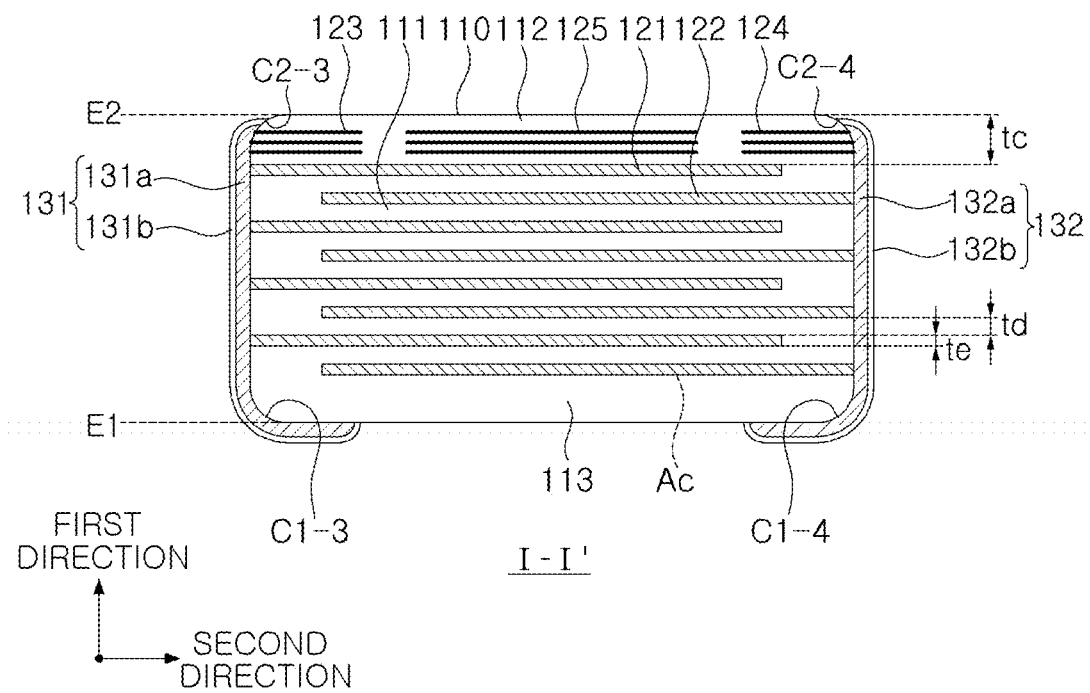
FIG. 7 is a cross-sectional view taken along line I-I' in FIG. 1 of a multilayer electronic component according to another exemplary embodiment in the present disclosure.

Meanwhile, referring to FIG. 7 corresponding to the cross-sectional view taken along line I-I' in FIG. 1 of a multilayer electronic component according to another exemplary embodiment in the present disclosure, the upper cover portion 112 may further include a third buffer electrode 125 disposed between the first buffer electrode 123 and the second buffer electrode 124 and spaced apart from the first and second buffer electrodes.

Although a main moisture penetration path is between the external electrodes and the body, moisture and the like may also penetrate through the surface of the body. Therefore, by disposing the third buffer electrode 125 between the first buffer electrode 123 and the second buffer electrode 124, a decrease in moisture resistance reliability due to moisture penetrating through the second surface may be suppressed.

In addition, margin portions 114 and 115 may be disposed on side surfaces of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or greater dielectric layers on both side surfaces of the capacitance forming portion Ac in the third direction (the width direction).

Meanwhile, the widths of the margin portions 114 and 115 may not be particularly limited. However, an average width of the margin portions 114 and 115 may be 15 µm or less in order to more easily achieve miniaturization and high capacitance of the multilayer electronic component.

An average width of the margin portions 114 and 115 may refer to an average size of a region in which the internal electrodes are spaced apart from the fifth surface in the third direction and an average size of a region in which the internal electrodes are spaced apart from the sixth surface in the third direction, and may be a value obtained by averaging sizes of the margin portions 114 and 115 in the third direction measured at five equally spaced points on the side surface of the capacitance forming portion Ac.

Therefore, in an exemplary embodiment, the average size of regions in which the internal electrodes 121 and 122 are spaced apart from the fifth and sixth surfaces in the third direction may be 15 µm or less.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

The first internal electrode 121 may be spaced apart from the fourth surface 4 and may be exposed to the third surface 3, and the second internal electrode 122 may be spaced apart from the third surface 3 and may be exposed to the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 is not connected to the second external electrode 132 but connected to the first external electrode 131, and the second internal electrode 122 is not connected to the first external electrode 131 but connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. Also, the first and second internal electrodes 121 and 122 may be spaced apart from the fifth and sixth surfaces of the body 110.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), indium (In), aluminum (Al), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), indium (In), aluminum (Al), and alloys thereof on a ceramic green sheet. A printing method of the conductive paste for internal electrodes may be a screen printing method or a gravure printing method, but the present disclosure is not limited thereto.

Meanwhile, a thickness te of the internal electrodes 121 and 122 may not be particularly limited.

However, in general, when the internal electrode is formed to be thin to have a thickness less than 0.6 μm, in particular, when the thickness of the internal electrode is 0.35 μm or less, it may be vulnerable to deterioration in reliability due to moisture, plating solution, etc. penetrating into the body.

According to an exemplary embodiment in the present disclosure, by disposing the buffer electrodes 123 and 124 in the upper cover portion 112, it is possible to prevent moisture, plating solution, etc. from penetrating into the body, so that excellent reliability may be secured even when the average thickness te of at least one of the plurality of internal electrodes 121 and 122 is 0.35 μm or less.

Consequently, when the thickness of the internal electrodes 121 and 122 is 0.35 μm or less, the effect according to the present disclosure may be more remarkable and miniaturization and high capacitance of the ceramic electronic component may be more easily achieved.

The average thickness te of the internal electrodes 121 and 122 may refer to an average thickness of the internal electrodes 121 and 122.

The average thickness of the internal electrodes 121 and 122 may be measured by scanning an image of a cross-section of the body 110 in the length-thickness (L-T) direction with a scanning electron microscope (SEM) having a magnification of 10,000. More specifically, the average value may be measured by measuring the thickness of one internal electrode at 30 equally spaced points in a longitudinal direction in the scanned image. The 30 points at equal intervals may be designated in the capacitance forming portion Ac. In addition, if the average value is measured by extending the measurement of the average value to 10 internal electrodes, the average thickness of the internal electrodes may be more generalized. Other methods and/or tools appreciated by one of ordinary skill in the art, even if not described in the present disclosure, may also be used.

The external electrodes 131 and 132 may be disposed on the third and fourth surfaces 3 and 4 of the body 110 and extend to a portion of the first surface.

The external electrodes 131 and 132 may include a first external electrode 131 disposed on the third surface, connected to the first internal electrode 121, and extending onto and disposed on a portion of the first surface and a second external electrode 132 disposed on the fourth surface, connected to the second internal electrode 122, and extending onto and disposed on a portion of the first surface.

Meanwhile, in the present exemplary embodiment, although the structure in which the multilayer electronic component 100 has two external electrodes 131 and 132 is described, the number and shape of the external electrodes 131 and 132 may be changed according to the shape of the internal electrodes 121 and 122 or other purposes.

Meanwhile, the external electrodes 131 and 132 may be formed using any material having electrical conductivity, such as metal, and a specific material may be determined in consideration of electrical characteristics, structural stability, and the like, and furthermore, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be fired electrodes including a conductive metal and glass or resin-based electrodes including a conductive metal and a resin.

In addition, the electrode layers 131a and 132a may have a form in which a fired electrode and a resin-based electrode are sequentially formed on the body. In addition, the electrode layers 131a and 132a may be formed by transferring a sheet including a conductive metal onto a body or by transferring a sheet including a conductive metal onto a fired electrode. In addition, the electrode layers 131a and 132a may be formed of a plating layer or a layer formed using a deposition method, such as a sputtering method or atomic layer deposition (ALD).

A material having excellent electrical conductivity may be used as the conductive metal included in the electrode layers 131a and 132a, but is not particularly limited. For example, the conductive metal may be at least one of nickel (Ni), copper (Cu), and alloys thereof.

The plating layers 131b and 132b may serve to improve mounting characteristics. The type of the plating layers 131b and 132b is not particularly limited, and may be a plating layer including at least one of Ni, Sn, Pd, and alloys thereof, and may be formed of a plurality of layers.

For a more specific example of the plating layers 131b and 132b, the plating layers 131b and 132b may be Ni plating layers or Sn plating layers, may have a form in which an Ni plating layer and an Sn plating layer are sequentially formed on the electrode layers 131a and 132a or may have a form in which a Sn plating layer, a Ni plating layer, and a Sn plating layer are sequentially formed. In addition, the plating layers 131b and 132b may include a plurality of Ni plating layers and/or a plurality of Sn plating layers. In addition, the plating layers 131b and 132b may have a form in which a Ni plating layer and a Pd plating layer are sequentially formed on the electrode layers 131a and 132a.

In an exemplary embodiment, the first and second external electrodes 131 and 132 may be disposed below an extension line E2 of the second surface.

As the first and second external electrodes 131 and 132 are disposed below the extension line E2 of the second surface, the volume occupied by the external electrodes in the multilayer electronic component may be reduced, thereby improving capacitance per unit volume. When the first and second external electrodes 131 and 132 are disposed below the extension line E2 of the second surface, moisture, plating solution, etc. may penetrate into the second surface and moisture resistance may deteriorate. However, as described above, according to the present disclosure, since the buffer electrodes 123 and 124 are included only in the upper cover portion, among the upper cover portion and the lower cover portion, the moisture resistance reliability may be improved, while the capacitance per unit volume of the multilayer ceramic capacitor is improved.

Here, disposing the first and second external electrodes 131 and 132 below the extension line E2 of the second surface may mean that the first and second external electrodes 131 and 132 are not disposed on the second surface.

In an exemplary embodiment, one end of the first external electrode 131 may be disposed at the corner C2-3 connecting the second surface to the third surface and the other end thereof may be disposed on the first surface. One end of the second external electrode 132 may be disposed at the corner C2-4 connecting the second surface to the fourth surface and the other end thereof may be disposed on the first surface.

The size of the multilayer electronic component 100 may not be particularly limited.

However, in order to achieve both miniaturization and high capacitance, the thickness of the dielectric layer and the internal electrodes should be decreased to increase the number of layers, and thus, the reliability improvement effect according to the present disclosure may be more remarkable in the multilayer electronic component 100 having a size of 1005 (length×width, 1.0 mm×0.5 mm) or less.

Therefore, considering manufacturing errors, external electrode sizes, etc., the reliability improvement effect according to the present disclosure may be more remarkable when the length of the multilayer electronic component 100 is 1.1 mm or less and the width is 0.55 mm or less. Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

EXAMPLES

Moisture resistance reliability of each of a case in which no buffer electrode is disposed on the upper cover portion (Comparative Example), a case in which the upper cover portion includes one linear first buffer electrode and one linear second buffer electrode (Example 1), a case in which the upper cover portion includes two linear first buffer electrodes and two linear second buffer electrodes (Example 2), a case in which the upper cover portion includes three linear first buffer electrodes and three linear second buffer electrodes (Example 3), a case in which the upper cover portion includes one first buffer electrode including a plurality of convex portions and one second buffer electrode including a plurality of convex portions (Example 4), a case in which the upper cover portion includes two first buffer electrodes each including a plurality of convex portions and two second buffer electrodes each including a plurality of convex portions (Example 5), and a case in which the upper cover portion includes three first buffer electrodes each including a plurality of convex portions and three second buffer electrodes each including a plurality of convex portions (Example 6) was evaluated and described in Table 1 below.

Comparative Example and Examples 1 to 6 had substantially the same configuration except for the configuration of the upper cover portion, and the external electrodes were formed to have an L-shaped structure.

In the evaluation of the moisture resistance reliability, it was checked whether defects occurred in 800 samples by applying a voltage for 48 hours under a step-up condition of 100 V/s at 85° C. and 85% of relative humidity. Here, a sample decreased by 101 times or more from a first insulation resistance (IR) value was determined to be defective.

TABLE 1

| Voltage application time (hr) | Number of defects | | | | | | |
|---|---|---|---|---|---|---|---|
| | Comparative Example | Example 1 | Example 2 | Example 3 | Example 4 | Example 5 | Example 6 |
| 0 | 0 | 0 | 0 | 0 | 0 | 0 | 0 |
| 4 | 0 | 0 | 0 | 0 | 0 | 0 | 0 |
| 8 | 0 | 0 | 0 | 0 | 0 | 0 | 0 |
| 12 | 1 | 0 | 0 | 0 | 0 | 0 | 0 |
| 16 | 1 | 0 | 0 | 0 | 0 | 0 | 0 |
| 20 | 1 | 0 | 0 | 0 | 0 | 0 | 0 |
| 24 | 6 | 4 | 2 | 0 | 2 | 0 | 0 |
| 28 | 17 | 8 | 6 | 4 | 1 | 2 | 1 |

TABLE 1-continued

| Voltage application time (hr) | Number of defects | | | | | | |
|---|---|---|---|---|---|---|---|
| | Comparative Example | Example 1 | Example 2 | Example 3 | Example 4 | Example 5 | Example 6 |
| 32 | 93 | 12 | 8 | 6 | 6 | 4 | 3 |
| 36 | 480 | 50 | 43 | 36 | 36 | 30 | 26 |
| 40 | 800 | 80 | 70 | 65 | 70 | 60 | 53 |
| 44 | 800 | 150 | 130 | 110 | 130 | 110 | 100 |
| 48 | 800 | 200 | 180 | 160 | 162 | 152 | 142 |

In the case of Comparative Example, it can be seen that defective samples occurred as the voltage application time passed 12 hours, and all the samples were defective when the voltage application time passed 40 hours.

In contrast, in the case of Example 1, defective samples occurred as the voltage application time passed 24 hours, and even after 48 hours, only 200 samples were defective, indicating that the moisture resistance reliability was remarkably improved.

Comparing Examples 1 to 3, it can be seen that the moisture resistance reliability improvement effect increases as the number of stacked buffer electrodes increases.

In addition, comparing Examples 1 to 3 with Examples 4 to 6, moisture resistance reliability of Examples 4 to 6 in which the buffer electrode included a first layer having a linear shape and a second layer disposed on the first layer and including a plurality of convex portions is improved, compared to Examples 1 to 3 in which the buffer electrode was formed to have only a linear shape.

As one of the various effects of the present disclosure, the reliability of the multilayer electronic component may be improved by disposing the buffer electrode only in the upper cover portion.

As one of the various effects of the present disclosure, the capacitance per unit volume of the multilayer electronic component may be improved.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including first and second surfaces facing each other in a first direction, third and fourth surfaces connected to the first and second surfaces and facing each other in a second direction, and fifth and sixth surfaces connected to the first to fourth surfaces and facing each other in a third direction, and the body comprises a capacitance forming portion including a dielectric layer and first and second internal electrodes alternately disposed with the dielectric layer interposed therebetween, a lower cover portion disposed between the first surface and the capacitance forming portion, and an upper cover portion disposed between the second surface and the capacitance forming portion, wherein, among the upper cover portion and the lower cover portion, only the upper cover portion includes a buffer electrode;
a first external electrode disposed on the third surface, connected to the first internal electrode, and extending onto and disposed on a portion of the first surface; and
a second external electrode disposed on the fourth surface, connected to the second internal electrode, and extending onto and disposed on a portion of the first surface, wherein the first and second external electrodes are not disposed on the second surface.

2. The multilayer electronic component of claim 1, wherein an average thickness of the buffer electrode is 0.1 μm or more and 4 μm or less.

3. The multilayer electronic component of claim 1, wherein the buffer electrode includes:
a first buffer electrode connected to the first external electrode, and
a second buffer electrode connected to the second external electrode.

4. The multilayer electronic component of claim 3, wherein the first and second buffer electrodes are arranged as two or more to ten or less buffer electrodes, respectively.

5. The multilayer electronic component of claim 4, wherein an average distance between adjacent first buffer electrodes, among the first buffer electrodes, is 0.2 μm or greater and 10 μm or less.

6. The multilayer electronic component of claim 3, wherein the upper cover portion further includes a third buffer electrode disposed between the first buffer electrode and the second buffer electrode and disposed to be spaced apart from the first and second buffer electrodes.

7. The multilayer electronic component of claim 1, wherein, in a cross-section of the multilayer electronic component in the first and third directions, the buffer electrode is linear.

8. The multilayer electronic component of claim 1, wherein, in the first direction, the buffer electrode is disposed between a 15/100 point and an 85/100 point of the upper cover portion.

9. The multilayer electronic component of claim 1, wherein the buffer electrode includes at least one of Ni, Cu, Pt, and Pd.

10. The multilayer electronic component of claim 1, wherein
the buffer electrode includes at least one additive ceramic particles and glass, and
a ratio of an area occupied by the at least one additive to a total area of the buffer electrode in a cross-section of the buffer electrode in the first and third directions is 20% or more and 60% or less.

11. The multilayer electronic component of claim 1, wherein, in a cross-section of the buffer electrode in the first and third directions, the buffer electrode includes a linear first layer, and a second layer disposed on the first layer, and the buffer electrode comprises a plurality of convex portions.

12. The multilayer electronic component of claim 11, wherein, in the cross-section of the buffer electrode in the first and third directions, an average size of the plurality of convex portions in the first direction is 0.1 μm or greater and 4 μm or less, and an average size of the plurality of convex portions in the third direction is 10 μm or greater and 100 μm or less.

13. The multilayer electronic component of claim 11, wherein, in the cross-section of the buffer electrode in the first and third directions, at least one convex portion among the plurality of convex portions has a semicircular shape.

14. The multilayer electronic component of claim 1, wherein the first and second external electrodes are disposed below an extension line of the second surface.

15. The multilayer electronic component of claim 1, wherein one end of the first external electrode is disposed at a corner connecting the second surface to the third surface and the other end of the first external electrode is disposed on the first surface, and one end of the second external electrode is disposed at a corner connecting the second surface to the fourth surface and the other end of the second external electrode is disposed on the first surface.

16. The multilayer electronic component of claim 1, wherein, in a cross-section of the multilayer electronic component in the first and third directions, the buffer electrode extends beyond ends of the first and second internal electrodes.

17. The multilayer electronic component of claim 16, wherein the buffer electrode includes:
 a first buffer electrode connected to the first external electrode,
 a second buffer electrode connected to the second external electrode, and
 a third buffer electrode disposed between the first buffer electrode and the second buffer electrode.

18. The multilayer electronic component of claim 17, wherein the third buffer electrode is spaced apart from the first and second buffer electrodes.

19. A multilayer electronic component comprising:
 a body including first and second surfaces facing each other in a first direction, third and fourth surfaces connected to the first and second surfaces and facing each other in a second direction, and fifth and sixth surfaces connected to the first to fourth surfaces and facing each other in a third direction, and the body comprises a capacitance forming portion including a dielectric layer and first and second internal electrodes alternately disposed with the dielectric layer interposed therebetween, a lower cover portion disposed between the first surface and the capacitance forming portion, and an upper cover portion disposed between the second surface and the capacitance forming portion, wherein, among the upper cover portion and the lower cover portion, only the upper cover portion includes a buffer electrode;
 a first external electrode disposed on the third surface, connected to the first internal electrode, and extending onto and disposed on a portion of the first surface; and
 a second external electrode disposed on the fourth surface, connected to the second internal electrode, and extending onto and disposed on a portion of the first surface,
 wherein the buffer electrode includes at least one additive ceramic particles and glass, and
 a ratio of an area occupied by the at least one additive to a total area of the buffer electrode in a cross-section of the buffer electrode in the first and third directions is 20% or more and 60% or less.

20. A multilayer electronic component comprising:
 a body including first and second surfaces facing each other in a first direction, third and fourth surfaces connected to the first and second surfaces and facing each other in a second direction, and fifth and sixth surfaces connected to the first to fourth surfaces and facing each other in a third direction, and the body comprises a capacitance forming portion including a dielectric layer and first and second internal electrodes alternately disposed with the dielectric layer interposed therebetween, a lower cover portion disposed between the first surface and the capacitance forming portion, and an upper cover portion disposed between the second surface and the capacitance forming portion, wherein, among the upper cover portion and the lower cover portion, only the upper cover portion includes a buffer electrode;
 a first external electrode disposed on the third surface, connected to the first internal electrode, and extending onto and disposed on a portion of the first surface; and
 a second external electrode disposed on the fourth surface, connected to the second internal electrode, and extending onto and disposed on a portion of the first surface,
 wherein, in a cross-section of the buffer electrode in the first and third directions, the buffer electrode includes a linear first layer, and a second layer disposed on the first layer, and the buffer electrode comprises a plurality of convex portions.

\* \* \* \* \*